Jan. 15, 1963   R. S. DICKINSON ETAL   3,073,245
HYDRAULIC PUMPS
Filed March 16, 1960
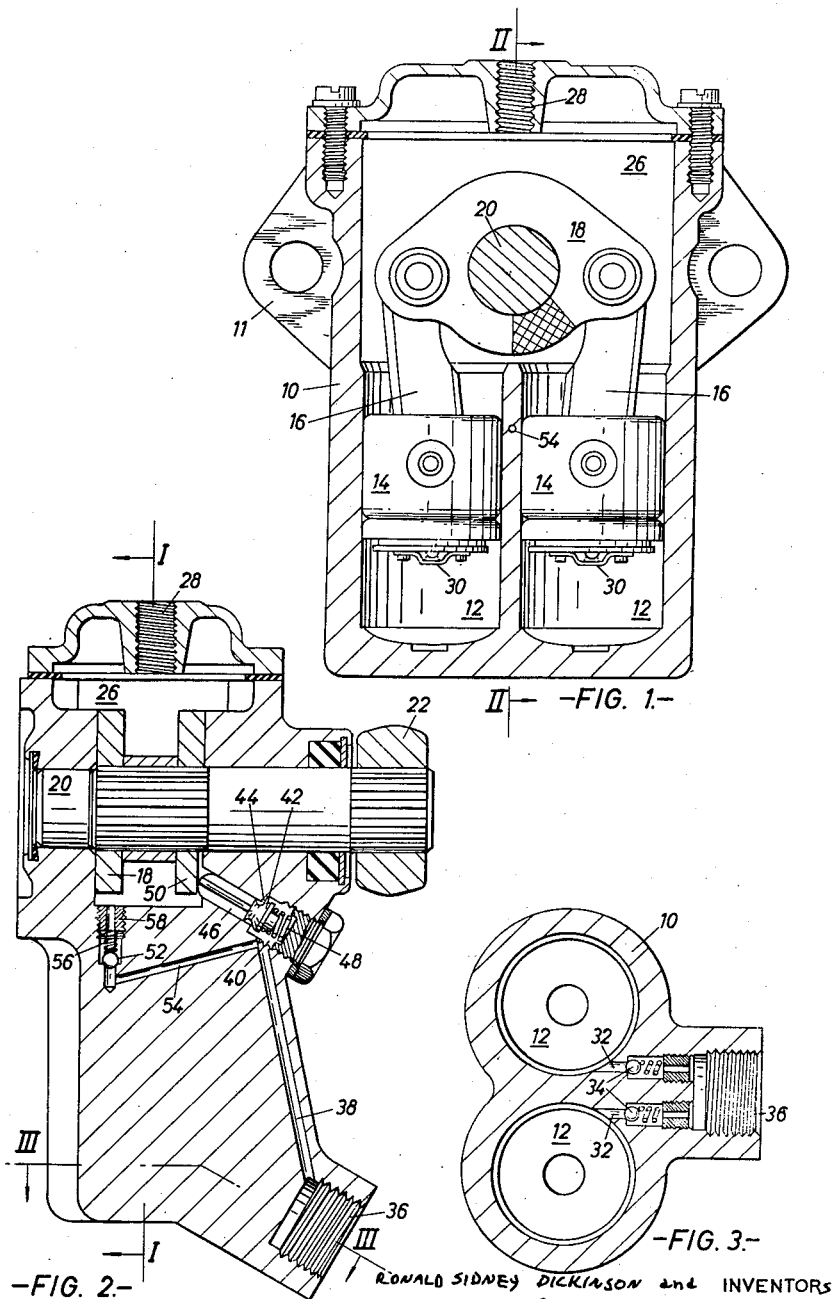
-FIG. 1.-
-FIG. 2.-
-FIG. 3.-
RONALD SIDNEY DICKINSON and MERVYN BARTRAM INVENTORS
BY
Mead, Browne, Schuyler & Beveridge   ATTORNEYS

United States Patent Office 3,073,245
Patented Jan. 15, 1963

3,073,245
HYDRAULIC PUMPS
Ronald Sidney Dickinson and Mervyn Bartram, York, England, assignors to Armstrong Patents Co. Limited, Beverley, England, a British company
Filed Mar. 16, 1960, Ser. No. 15,494
2 Claims. (Cl. 103—41)

This invention concerns hydraulic pumps, and relates more particularly to hydraulic pumps for incorporation in spring suspension systems, for example for road vehicles, wherein one region of a suspension spring is carried by a hydraulic ram to which a hydraulic medium may be supplied under pressure or from which hydraulic medium may be exhausted for the purpose of modifying the spring attitude relative to and on variation of a load supported by said spring.

In one prior vehicle suspension system such as that described above, hydraulic medium under pressure is supplied to the hydraulic ram by a double-acting, lever type shock absorber adapted also to act as a hydraulic pump. As an alternative to such a combined hydraulic pump and shock absorber, the present invention seeks to provide a hydraulic pump alone, i.e. one which is substantially free from any shock absorbing action except that inherent in any construction of hydraulic pump.

According to the present invention, a hydraulic pump comprises an at least partly hollow pump body, the hollow interior of said body constituting a reservoir for hydraulic medium and, with at least one cylinder having a hydraulic piston reciprocable therein, said cylinder communicating with said reservoir, a pump inlet valve in said piston, a semi-rotary spindle adapted for reciprocation from externally of said body, a crank carried by said spindle, means connecting said crank to said piston for reciprocating said piston in said cylinder, said pump body being provided with an outlet connection and with a delivery conduit extending between said cylinder and said outlet connection, a pump outlet valve arranged in said delivery conduit, said outlet connection being adapted for communication with a hydraulic operating member such as a hydraulic ram, whereby during operation of said pump, said hydraulic operating member is supplied with hydraulic medium under pressure, and a pressure relief valve for hydraulic medium arranged in a passage provided in the pump body to extend between said outlet connection and said reservoir, said relief valve being adapted to open on the attainment of a predetermined angular position of said spindle within said body.

To guard against the occurrence of a hydraulic lock between the pump and the hydraulic operating member, the pump body may further comprise an overload valve arranged between the outlet connection and the reservoir and set to open when a given hydraulic pressure is exceeded.

In a modification of the hydraulic pump proposed by the invention, instead of or in addition to employing the hollow interior of the pump body as an integral reservoir, said body is provided with an inlet connection adapted for communication with an independent reservoir, arranged to supplement or to replace the reservoir capacity of the hollow interior of said body, and said relief valve and (when provided) said overload valve are arranged to communicate with said inlet connection and thence with said independent reservoir.

Preferably the pump is formed with a pair of hydraulic cylinders arranged symmetrically in said pump body either in side-by-side or in opposed relationship, and each receiving a reciprocable piston operated from a double crank carried by said spindle, there being a delivery conduit and outlet valve leading from each cylinder to a common outlet connection, and an inlet valve in each piston. The overload valve may conveniently be disposed in a passage formed in the pump body and branching from the passage containing the pressure relief valve, and the relief valve itself may with advantage have a valve member adapted for unseating by a plunger bearing against a cam or equivalent element carried by the semi-rotary spindle. Where the pump is intended for co-operation with a vehicle suspension system, the semi-rotary spindle may be adapted for the application of vehicle suspension movements thereto either by means of a single lever secured to an end of the spindle projecting from the pump body, or alternatively, said spindle may at both its ends project from either side of the pump body so as to receive a wishbone, or the like member, whereby the pump may be directly incorporated in the vehicle suspension system.

The invention will be described further, by way of example, with reference to the accompanying drawings, in which:

FIG. 1 is a vertical sectional elevation taken on the line I—I of FIG. 2 of a hydraulic pump embodying the invention;

FIG. 2 is a transverse vertical sectional elevation taken on the line II—II of FIG. 1, and FIG. 3 is a sectional detail taken on the line III—III of FIG. 2.

The pump shown in the drawings is intended for use in connection with a road vehicle spring suspension system wherein one region of the suspension spring is carried by a hydraulic ram, whereby the spring attitude relative to the vehicle chassis may be modified in dependence upon the load carried by the vehicle in order to maintain a substantially constant riding height and level attitude of the vehicle under widely varying load conditions.

The pump comprises a body 10 formed with a pair of identical cylinders 12 arranged in parallel, side-by-side relationship and each housing a hollow piston 14 which is reciprocable in its cylinder by way of a connecting rod 16, crank 18 and semi-rotary spindle 20 journalled in and projecting at one end from the body 10 and carrying a lever arm 22 adapted for the application of suspension movements thereto. As shown, the body 10 may be secured by means of lugs 24 to the vehicle chassis, the lever arm 22 being connected to the vehicle suspension spring (not shown), or the relative connections of the body 10 and lever arm 22 to said chassis and spring may be reversed.

The region of the body 10 within which the spindle 20 is journalled constitutes a reservoir 26 for a hydraulic medium, and the reservoir 26 may, if desired, be connected at 28 to an additional, external reservoir (not shown). The cylinders 12 each open at their upper ends into the reservoir 26, and each of the pistons 14 has an inlet valve indicated at 30, so that when the spindle 20 is reciprocated to reciprocate the pistons, hydraulic medium is transferred from the upper to the lower sides of the pistons. At their bottom ends, the cylinders each open into a delivery conduit 32 wherein is arranged an outlet valve 34, and conduits 32 both communicate with an outlet connection 36. Thus, when the pump is operated, hydraulic medium is constantly delivered under pressure to the outlet connection 36, whence it may be applied to the aforementioned spring supporting ram, in order to extend said ram when the vehicle loading is increased and thereby compensate for the lowering in chassis height occasioned by the increased load.

To enable the ram to retract when vehicle loading is decreased and it is desired to allow the chassis to sink to compensate for said decreased load, the body 10 is formed with a passage 38 leading from the outlet connection to a valve chamber 40 communicating with the reservoir 26, and within the valve chamber 40 is arranged a pressure relief valve member 42 bearing against a valve seat 44 of the chamber 40 and extending away from said seat to present a fluted plunger 46 which is urged by the relief valve spring 48 against a face cam 50 carried on the spindle 20. The cam face is so formed, and the cam 50 itself is so angularly fixed on the spindle 20 that when the angular position of lever arm 22 and hence of spindle 20 corresponds to a desired mean attitude of the vehicle suspension spring relative to the chassis (thus determining a desired mean riding height of said chassis), the plunger-operating region of the cam face is just incident upon the plunger 46. Any decrease in vehicle loading which causes the operating region of the cam face to be brought more positively against the plunger thus unseats the valve member 42 to allow hydraulic medium to exhaust from the ram back through the connection 36, the passage 38 and valve chamber 40 to the reservoir 26.

Since, under some circumstances, an immovable column of hydraulic medium could extend between the cylinders 12 and the ram, the pump also incorporates an overload valve 52 arranged in a passage 54 branching from the passage 38 so as to communicate with the reservoir 26. The overload valve 52 is adjustably loaded by means of spring 56 and a retaining nut 58, so that it may be set to open when an appropriate maximum pressure occurs in a hydraulic system of which the pump form a part. In this way, hydraulic locks are avoided.

Although the embodiment of the invention shown in the drawings has been described in connection with a hydraulically compensated vehicle spring suspension system, it will be clear that it is not restricted to use in such a system, but may be employed wherever a source of hydraulic medium under pressure is required, and means is available to appropriately reciprocate the spindle 20. Typical further applications of the pump, in fact, lie in hydraulic power-assisted vehicle steering mechanisms and hydraulically operated vehicle clutches.

We claim:

1. A hydraulic pump comprising an at least partly hollow body member, the hollow interior of said body member constituting a reservoir for a hydraulic medium, a pair of hydraulic cylinders arranged in parallel, side-by-side relation in said body member and each communicating at one of its ends with said reservoir, a hollow piston reciprocable in each hydraulic cylinder, a pump inlet valve in each piston for passing hydraulic medium through said piston from said reservoir and into said cylinder, a rockable spindle journalled in said body member and extending into the hollow interior thereof, a crank carried on said spindle within said hollow interior, a pair of connecting rods each secured at one end to one of said pistons and at the other end to said crank, whereby said pistons are displaceable in their respective cylinders responsive to turning movement of said spindle, said body member being formed with an outlet for hydraulic medium and with a pair of delivery conduits each connecting the other end of one of said cylinders with said outlet, a pump delivery valve in each of said conduits, said body member being further formed with a first passage connecting said outlet with said reservoir, a plunger-operated fluid pressure relief valve arranged in said first passage, cam means arranged on said crank, spring means urging the operating plunger of said relief valve against said crank for enabling said cam means to open said relief valve and permit the transfer of hydraulic medium from said outlet to said reservoir whenever the spindle and crank attain a predetermined angular relation relative to said body member, said body member having a second passage formed therein from said reservoir to said first passage and joining said first passage at a position intermediate said outlet and said relief valve, and an overload valve arranged in said second passage to transfer hydraulic medium from said outlet to said reservoir whenever the pressure of hydraulic medium at said outlet exceeds a predetermined maximum value.

2. A hydraulic pump comprising an at least partly hollow body member, the hollow interior of said body member constituting a reservoir for hydraulic medium, a pair of hydraulic cylinders in said body member and each opening at one of its ends directly into said reservoir, a piston reciprocable in each hydraulic cylinder, means including a pump inlet valve in each piston for passing hydraulic medium through said piston from said reservoir and into said cylinder, a rockable spindle journalled in said body member and extending into the hollow interior thereof adjacent the cylinder ends, means connecting said spindle with said pistons for displacing said pistons in their respective cylinders responsive to turning movement of said spindle, said body member being formed with an outlet for hydraulic medium and with a pair of delivery conduits each connecting the other end of one of said cylinders with said outlet, a pump delivery valve in each of said conduits, said body member being further formed with a passage connecting said outlet with said reservoir, a plunger-operated fluid pressure relief valve arranged in said passage, cam means carried on said spindle, and spring means urging the operating plunger of said relief valve against said cam means for opening said relief valve to permit the transfer of hydraulic medium from said outlet to said reservoir whenever said spindle and said cam means attain a predetermined angular relation relative to said body member, said body member having a second passage extending between said reservoir and said first-mentioned passage and joining said first-mentioned passage at a position intermediate said outlet and said relief valve, and said pump further comprising an overload valve arranged in said second passage for transferring hydraulic medium from said outlet to said reservoir whenever the pressure of hydraulic medium at said outlet exceeds a predetermined maximum value.

References Cited in the file of this patent

UNITED STATES PATENTS

| | | |
|---|---|---|
| 705,731 | Ach | July 29, 1902 |
| 1,982,770 | Tollison | Dec. 4, 1934 |
| 2,044,814 | Rothrock | June 23, 1936 |
| 2,440,060 | Page | Apr. 20, 1948 |
| 2,563,912 | Belinkin | Aug. 14, 1951 |
| 2,672,014 | Yarger | Mar. 16, 1954 |
| 2,687,311 | Nallinger | Aug. 24, 1954 |
| 2,784,978 | Scale | Mar. 12, 1957 |
| 2,825,579 | Heiss | Mar. 4, 1958 |
| 2,935,313 | Momchilov et al. | May 3, 1960 |
| 2,970,831 | Wordsworth | Feb. 7, 1961 |
| 2,970,832 | Wordsworth | Feb. 7, 1961 |

FOREIGN PATENTS

| | | |
|---|---|---|
| 1,207,025 | France | Aug. 31, 1959 |